Nov. 24, 1931.  L. E. HURST  1,832,932
TRUCK
Filed Jan. 21, 1929  3 Sheets-Sheet 1
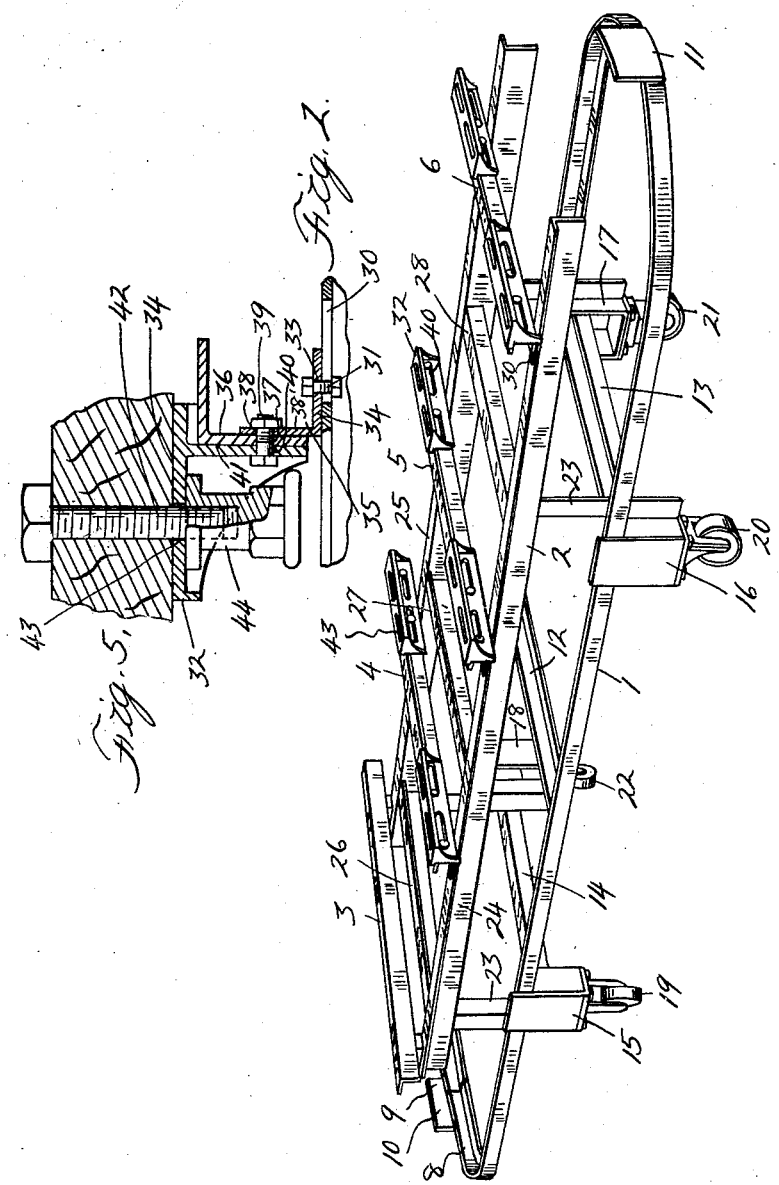
INVENTOR
Leonard E. Hurst
BY
ATTORNEYS Nov. 24, 1931.  L. E. HURST  1,832,932
TRUCK
Filed Jan. 21, 1929  3 Sheets-Sheet 2
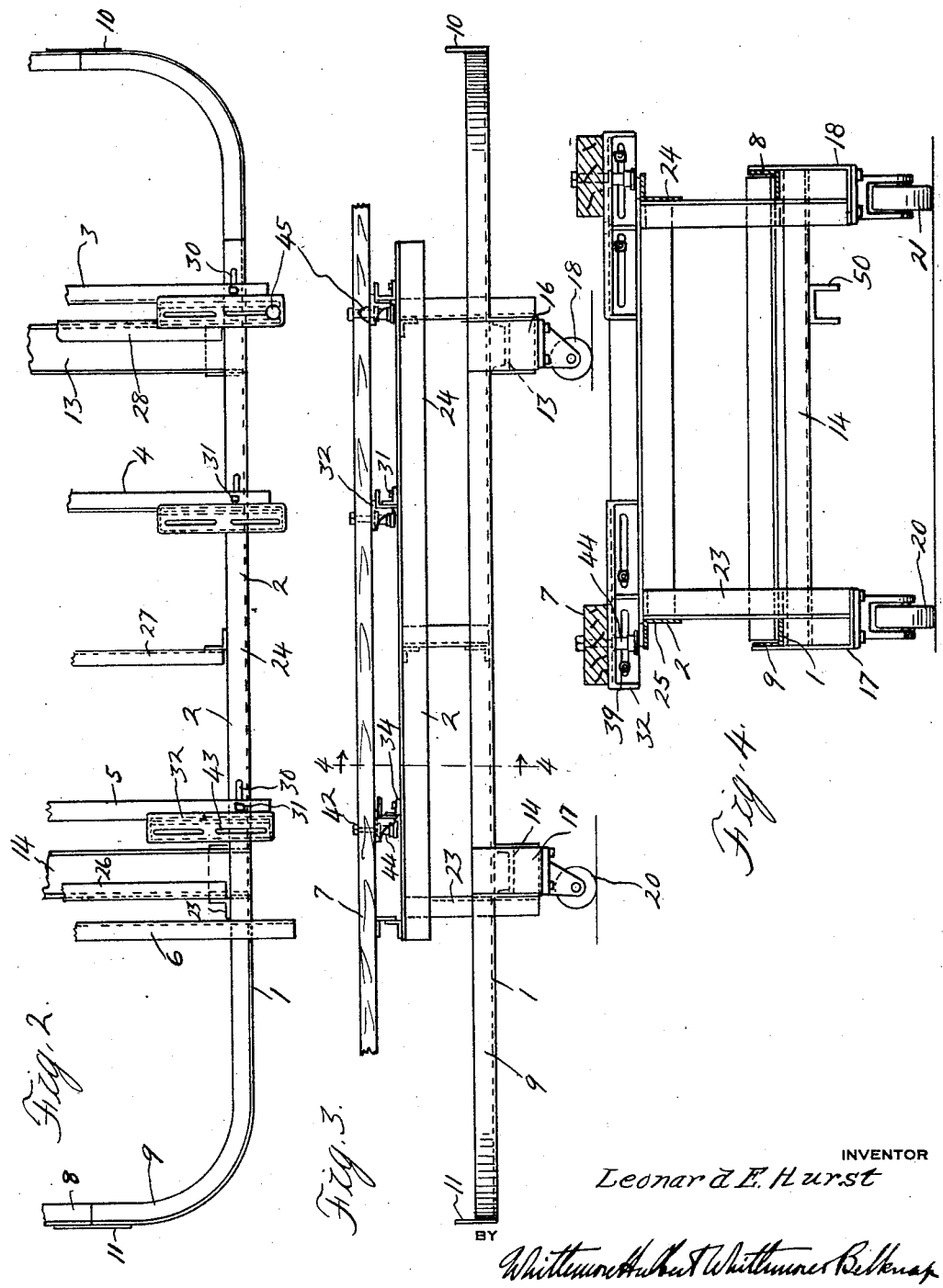
INVENTOR
Leonard E. Hurst
BY
ATTORNEYS Nov. 24, 1931.  L. E. HURST  1,832,932
TRUCK
Filed Jan. 21, 1929  3 Sheets-Sheet 3
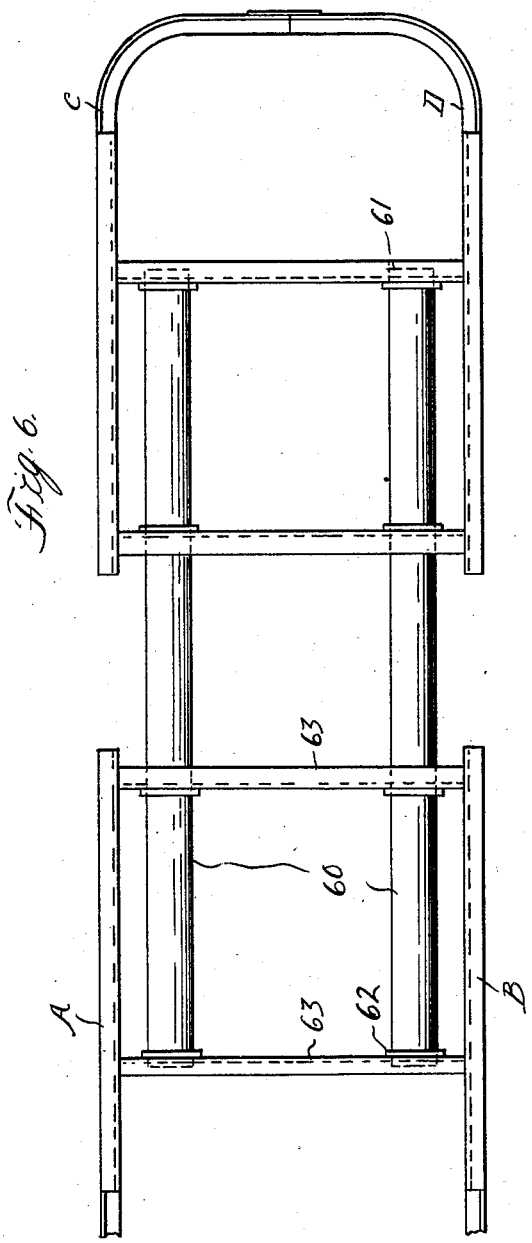
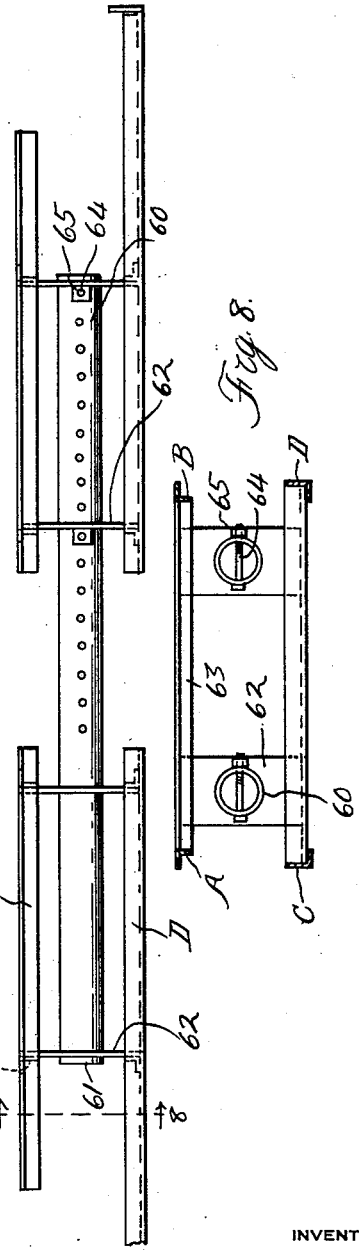
INVENTOR
Leonard E. Hurst
BY
ATTORNEYS Patented Nov. 24, 1931

1,832,932

UNITED STATES PATENT OFFICE

LEONARD E. HURST, OF DETROIT, MICHIGAN, ASSIGNOR TO WHITEHEAD & KALES COMPANY, OF DETROIT, MICHIGAN, A CORPORATION OF MICHIGAN

TRUCK

Application filed January 21, 1929. Serial No. 334,008.

This invention relates generally to trucks and refers more particularly to hand or chain actuated trucks designed for transporting vehicle bodies and the like in factories.

One of the essential objects of the invention is to provide a strong and durable truck of this type having parts that are readily adjustable to accommodate vehicle bodies of various dimensions.

In the accompanying drawings,—

Figure 1 is a perspective view of a truck embodying my invention;

Figure 2 is a fragmentary top plan view of the construction shown in Figure 1;

Figure 3 is a fragmentary side elevation of the construction shown in Figures 1 and 2;

Figure 4 is a sectional view taken on the line 4—4 of Figure 3;

Figure 5 is a detail view of one of the nuts used with the vehicle body anchoring bolts for anchoring the vehicle body upon the truck;

Figure 6 is a plan view of a slightly modified form of truck;

Figure 7 is a side elevation of the construction shown in Figure 6; and

Figure 8 is a section on the line 8—8 of Figure 7.

Referring now to the drawings, 1 is the lower frame, 2 is the upper frame, and 3, 4, 5 and 6 respectively are seats for the base or sill members 7 of a vehicle body. As shown, the lower frame 1 is oval shape and comprises two bars 8 and 9 of L cross section, a pair of vertical buffer plates 10 and 11, and an intermediate cross bar 12. Preferably, the bars 8 and 9 are parallel throughout the major portion of their length and have inwardly curved end portions arranged end to end and welded together. The plates 10 and 11 bridge the joints between the end portions of the bars 8 and 9 and are welded to the vertical webs thereof, and the cross bar 12 rests upon and is welded to the horizontal webs of the bars 8 and 9 intermediate of their ends. In the present instance channel shaped cross bars 13 and 14, boxlike uprights 15, 16, 17 and 18, and castors or wheels 19, 20, 21 and 22 respectively are used as a carriage for the lower frame 1. Preferably the cross bars 13 and 14 are welded to the uprights 15, 16, 17 and 18 and the latter are welded to the bars 8 and 9. The upper frame 2 is supported in substantially parallel relation to the lower frame 1 by struts 23 of L cross section and comprises two substantially parallel rails 24 and 25 of inverted L cross section and three cross bars 26, 27 and 28 respectively of inverted L cross section. Preferably the struts 23 are welded to the rails 24 and 25 of the upper frame and extend below the lower frame 1 and are welded to the cross members 13 and 14 and to the uprights 15, 16, 17 and 18 respectively of the carriage. The cross bars 26, 27 and 28 are also welded to the rails 24 and 25 adjacent to the struts 23. The seats 3, 4, 5 and 6 for the vehicle body are in effect cross bars and are adjustable upon the rails 24 and 25. Preferably openings 30 are formed in the rails 24 and 25 for receiving anchoring bolts 31 for the vehicle body seats 3, 4, 5 and 6 respectively whereby the latter may be held in various positions longitudinally of the rails to accommodate vehicle bodies of various lengths and castings 32 are adjustable longitudinally of the said seats 4, 5, and 6 respectively to accommodate vehicle bodies of various widths. As shown, the anchor bolts 31 for the seats extend through openings 33 in the bases 34 of substantially L-shaped slides 35 secured to the vertical webs 36 of the seats, while aligned openings 37 and 38 respectively are formed in the vertical webs 36 of the seats and in the vertical webs 38' of the slides 35 for receiving anchor bolts 39 for the adjustable castings 32. Preferably elongated longitudinally extending slots 40 are provided in the vertical webs 41 of the castings for receiving these anchor bolts 39.

In use, the anchor bolts 31 for the seats 4, 5 and 6 are received in the proper openings 30 in the rails, whereupon the bolts 42 of the vehicle body are received in the slots 43 in the castings 32 and are held in position by the nuts 44. As shown, these nuts 44 are closed like an acorn nut so that paint upon the vehicle body will not get into or harden upon the threads of the nuts 44 and/or bolts 42. Thus vehicle bodies of various dimensions may be readily accommodated on the truck by adjusting the seats 4, 5, and 6 relative to the rails 24 and 25 and adjusting the castings 32 on the said seats. If desired two or more studs 45 may be used in the slots 43 of the castings for locating the vehicle body upon the seats. Such studs are particularly useful and desirable when the first body of a given line is placed upon the seats so that the said seats may be in proper position for supporting succeeding bodies of a corresponding size. In use, the truck may be moved about by hand or may be moved by a suitable chain (not shown) that is ordinarily used in moving trucks of this type over the rails of tracks on the flooring of factories. In this connection an inverted U-shaped bracket 50 is secured to the cross bar 14 of the carriage for engagement with the usual track guide rail (not shown).

In Figures 6 and 7 I have shown a slight modification in which the upper and lower frames 2 and 1 respectively of the truck are formed of adjustable sections A, B, C and D respectively. With this construction tubes 60 having end flanges 61 extend through depending aprons 62 rigid with cross bars 63 of the frame sections and are held in adjusted position by bolts 64 that extend through the tubes 60 and through blocks 65 rigid with the aprons 62. Thus such trucks may be readily lengthened to accommodate extra long vehicle bodies by merely separating the sections of the truck to the desired position and holding the said sections in that position by the engagement of the bolt 64 with the proper openings in the tubes 60 and with the blocks 65 carried by the aprons 62.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. A single deck truck of the class described, having upper and lower substantially horizontal frames, the distance between said frames being less than the width of either of said frames, the lower frame being longer than the upper frame and being substantially oval shaped, the upper frame having substantially parallel rails extending longitudinally of the lower frame, and cross bars connected to and adjustable longitudinally of said rails.

2. A single deck truck of the class described, having upper and lower substantially horizontal frames, each frame having substantially parallel rails, the distance between said frames being less than the width of either of said frames, wheeled uprights secured to the rails of the lower frame, and struts rising from the wheeled uprights and secured to the rails of the upper frame.

3. A single deck truck of the class described, having upper and lower substantially horizontal elongated frames, the lower frame being longer than the upper frame and having substantially parallel longitudinally extending rails, the distance between said frames being less than the width of either of said frames, the rails of the lower frame having curved end portions secured together at approximately the longitudinal median line of the vehicle, and bumper plates overlapping the joints between said meeting end portions and secured to the said end portions.

4. In a vehicle of the class described, a frame having spaced longitudinally extending rails, cross bars extending between and rigid with said rails, and means for carrying vehicle bodies of different dimensions on said frame, including cross bars extending across and slidable longitudinally of said rails, and vehicle body supporting members adjustable longitudinally of said last mentioned cross bars, having portions forming seats for portions of a vehicle body and having openings therein for receiving vehicle anchorage means.

5. A single deck truck of the class described, comprising upper and lower frames, each frame having substantially parallel rails, wheeled uprights secured to the rails of the lower frame, uprights extending between and rigidly secured to said upper and lower frames, and vehicle body supporting means bodily adjustable longitudinally of the rails of the upper frame.

6. In a truck of the class described, a frame comprising substantially parallel longitudinally extending rails and cross bars extending between and rigid with said rails, and means for carrying vehicle bodies of different dimensions on said frame, and including cross bars extending between and bodily adjustable longitudinally of said rails, and seats for said vehicle bodies adjustable longitudinally of said last mentioned cross bars.

7. In a vehicle of the class decribed, a substantially horizontal frame comprising spaced longitudinally extending rails and cross bars extending between and rigidly secured to said rails, cross bars extending across and shiftable longitudinally of the upper faces of said rails, and vehicle body seats adjustable longitudinally of said last mentioned cross bars and having openings therein for receiving vehicle body anchorage bolts.

8. In a vehicle of the class described, a substantially horizontal frame comprising spaced longitudinally extending rails and cross bars extending between and rigidly secured to said rails, cross bars extending across and shiftable longitudinally of the upper faces of said rails, and castings slidable longitudinally of said last mentioned bars and having flat faces constituting seats for portions of a vehicle body, said seats being provided with slots for receiving vehicle body anchorage bolts.

In testimony whereof I affix my signature.

LEONARD E. HURST.